(12) United States Patent
Koyama et al.

(10) Patent No.: US 8,104,332 B2
(45) Date of Patent: Jan. 31, 2012

(54) PROBE AND CANTILEVER

(75) Inventors: Kouji Koyama, Tokyo (JP); Toshiro Kotaki, Tokyo (JP); Kazuhiko Sunagawa, Tokyo (JP)

(73) Assignee: Namiki Seimitsu Houseki Kabushiki Kaisha (JP)

( * ) Notice: Subject to any disclaimer, the term of this patent is extended or adjusted under 35 U.S.C. 154(b) by 0 days.

(21) Appl. No.: 12/837,171

(22) Filed: Jul. 15, 2010

(65) Prior Publication Data

US 2010/0293675 A1 Nov. 18, 2010

Related U.S. Application Data

(63) Continuation of application No. 12/089,349, filed on Apr. 4, 2008, now abandoned.

(30) Foreign Application Priority Data

Oct. 6, 2005 (JP) ................................. 2005-294183

(51) Int. Cl.
*G01Q 60/38* (2010.01)
*G01Q 70/10* (2010.01)
*G01Q 70/14* (2010.01)
*G01Q 70/16* (2010.01)

(52) U.S. Cl. ............... 73/105; 850/40; 850/52; 850/56; 850/57; 850/59; 850/60

(58) Field of Classification Search ............ 73/105; 850/40, 52, 56, 57, 59, 60; 324/755.07
See application file for complete search history.

(56) References Cited

U.S. PATENT DOCUMENTS

| 4,943,719 | A | * | 7/1990 | Akamine et al. ................ 850/57 |
| 5,066,358 | A | * | 11/1991 | Quate et al. ....................... 216/2 |
| 5,193,385 | A | | 3/1993 | Nishioka et al. |
| 5,702,822 | A | * | 12/1997 | Terui et al. .................... 428/446 |
| 5,831,181 | A | * | 11/1998 | Majumdar et al. ............. 73/863 |

(Continued)

FOREIGN PATENT DOCUMENTS

| JP | 2-239192 | | 9/1990 |
| JP | 4-106852 | | 4/1992 |
| JP | 5-203444 | | 8/1993 |
| JP | 2005-075681 | A | 3/2005 |
| JP | 2005-317893 | A | 11/2005 |
| WO | 2005/093775 | | 10/2005 |

OTHER PUBLICATIONS

Niedermann, P. et al., "CVD Diamond Probes for Nanotechnology", Applied Physics A: Materials Science and Processing, vol. 66, 1998, pp. S31-S34.*

(Continued)

*Primary Examiner* — Daniel Larkin

(74) *Attorney, Agent, or Firm* — Studebaker & Brackett PC; Donald R. Studebaker

(57) ABSTRACT

To provide a probe 1 for use in a cantilever 2 of an scanning probe microscope (SPM) manufacturable in a simple manufacturing process and usable while allowing full use of the properties of single-crystalline material and a cantilever 2 using that probe. A probe 1 disposed at the tip of beam part 2*a* of a cantilever 2 used for an SPM, wherein the probe 1 comprises a needle-like part 1*a* having a length of not less than 10 μm or and a flat plate part 1*b* having a face contacting a beam part of the cantilever, the needle-like part 1*a* and the flat plate part 1*b* are integrally formed with a single-crystalline material, and at least one side face of the flat plate part 1*b* contains a flat surface 1*c* in order to indicate the crystal orientation of the single-crystalline material.

6 Claims, 5 Drawing Sheets

U.S. PATENT DOCUMENTS

| | | | |
|---|---|---|---|
| 5,856,672 | A | 1/1999 | Ried |
| 6,000,280 | A | 12/1999 | Miller et al. |
| 6,013,573 | A | 1/2000 | Yagi |
| 6,211,532 | B1 * | 4/2001 | Yagi ................................ 257/40 |
| 6,408,122 | B1 | 6/2002 | Shimada et al. |
| 6,504,152 | B2 * | 1/2003 | Hantschel et al. ............. 850/56 |
| 6,635,870 | B1 * | 10/2003 | Pachuta et al. ................ 250/306 |
| 6,902,716 | B2 * | 6/2005 | Lee et al. ....................... 423/446 |
| 6,989,535 | B2 * | 1/2006 | Tani et al. ...................... 250/306 |
| 7,187,166 | B2 * | 3/2007 | Sugano .......................... 324/234 |
| 2008/0044647 | A1 | 2/2008 | Nishibayashi et al. |

OTHER PUBLICATIONS

Yan, C. et al., "Very High Growth Rate Chemical Vapor Deposition of Single-Crystal Diamond", PNAS, vol. 99, No. 20, Oct. 1, 2002, pp. 12523-12525.*

Park, J.K. et al., "Fabrication of Diamond Tip Cantilever and its Application to Tribo-nanolithography"; 2005 IEEE International Symposium on Computational Intelligence in Robotics and Automation; pp. 695-700; Jun. 27-30, 2005; Espoo, Finland.

Akiyama, T. et al ., "Atomic force microscope for planetary applications"; Sensors and Actuators A, vol. 91, 2000, pp. 321-325.

Lange, D. et al., "Parallel Scanning AFM with On-Chip Circuitry in CMOS Techonolgy"; Twelfth IEEE International Conference on MEMS 1999; pp. 447-452.

Beuret, C. et al., "Conical diamond tips realized by a double-molding process for high-resolution profilometry and atomic force microscopy applications"; Applied Physics Letters, vol. 76, No. 12, Mar. 20, 2000, pp. 1621-1623.

* cited by examiner

PROBE AND CANTILEVER

CROSS REFERENCE TO RELATED APPLICATIONS

The present application is a continuation of application Ser. No. 12/089,349, filed Apr. 4, 2008, now abandoned, the entire contents of the applications being incorporated herein by reference in their entirety.

FIELD OF THE INVENTION

The present invention relates to a probe for use in a scanning probe microscope comprising a single-crystalline material having various properties and a cantilever onto which the probe is disposed.

DESCRIPTION OF RELATED ART

Scanning probe microscopes (hereafter SPM) are widely used as instruments for observing material surfaces in nanoscale resolution. An SPM obtains images using atomic forces and other interactions that occur between the probe tip and a sample surface.

A probe constituting the key part of an SPM is required to have an atomically sharp point. Generally, when manufactured using a single-crystalline material, a probe can easily be formed to have a sharp point. As measurement and observation needs for sample materials with high aspect ratios have been rising, in particular, over the recent years, there is increasingly high demand for probes with a long needle part. Accordingly, single-crystalline materials are increasing the importance of their role.

Previously known conventional methods to fix a probe made of a single-crystalline material, such as single crystal diamond, onto a beam part of a cantilever include the following:

(1) a method of manufacturing a cantilever for atomic force microscope comprising
a process of forming a photoresist on a one side surface of a silicon wafer,
a process of patterning the photoresist,
a process of etching the silicon wafer using the patterned photoresist as a mask,
a process of removing the photoresist after completion of etching,
a process of scratching the surface opposite to the etched surface of the silicon wafer,
a process of growing a diamond to be a probe on the scratched region,
a process of forming an oxide film on the silicon wafer surface after the growth of the diamond,
a process of forming a nitride film on the oxide film surface,
a process of forming a patterned photoresist mask for etching for removing nitride films from the diamond probe and the back side of the silicon wafer,
a process of removing the photoresist,
a process of additionally etching an etched region of the silicon wafer until exposing an oxide film on the diamond probe-formed side of the silicon wafer,
and a process of forming a thin metal film on the etched region of the silicon wafer after completion of etching (Patent Document 1)
(2) a method wherein a rough diamond is fixed in a round stylus holder comprising a magnetic material in order to grind the diamond into a stylus, magnetize the magnetic material of the stylus holder, spread an glue on the beam part of a cantilever, fix the stylus holder on the glue spread surface of the beam part, and separate the magnet from the beam part after solidification of the glue so that the magnetic material of the stylus holder will be demagnetized (Patent Document 2).

[Patent Document 1] JP-A-H05-203444
[Patent Document 2] JP-A-H04-106852

DISCLOSURE OF THE INVENTION

The method according to the method of Patent Document 1, wherein a probe comprising diamond is formed on the beam part of a cantilever, however, involves many compulsory steps, such as resist and nitride film formation and removal, and therefore has a complicated process.

Moreover, the method according to the method of Patent Document 1, wherein a probe made of diamond is formed on the beam part of a cantilever, requires that the diamond grow inside a hole disposed through the surrounding silicon. The crystalline lattice constant of a diamond growing in there differs significantly from that of the silicon of the beam part. Consequently, the grown crystal of the probe can often be defective and have a drawback of reducing the mechanical strength of the probe.

In addition, in the method according to Patent Document 2, a stylus holder is fixed by using the glue on a cantilever, and a stylus (probe) comprising diamond is fixed on the stylus holder. Thus, this method involves two interfaces between the stylus and the cantilever, and consequently has a high possibility of a shift of the crystal orientation of the diamond on each interface and hence a drawback of being unable to manufacture a probe that makes full use of the properties of the material.

In view of the aforementioned drawbacks, it is an object of the present invention to provide a probe for use in a cantilever of an SPM manufacturable in a simple manufacturing process and usable while allowing full use of the properties of a single-crystalline material and a cantilever using that probe.

The inventors have completed the present invention based on their finding that the properties of a probe can be taken full advantage of when a probe having an optimally selected crystal orientation is formed independently of a beam part of a cantilever and mounted on the beam part by means of a flat plate part formed on the base of the probe.

In other words, a first disclosed embodiment is a probe disposed at the tip of a cantilever used for an SPM, the probe comprising a needle-like part having a length of not less than 10 micrometers and a flat plate part having a face contacting the beam part of the cantilever, the needle-like part and the flat plate part are integrally formed with a single-crystalline material, and at least one side face of the flat plate part containing a flat surface in order to indicate the crystal orientation of the single-crystalline material.

Meanwhile, a second disclosed embodiment is a probe characterized by a structure according to the above-summarized first embodiment and further characterized by the flat surface comprising both side faces of the flat plate part parallel to each other.

Then, two mutually parallel flat surfaces will facilitate the holding of the probe when mounting the probe on the beam part of the cantilever.

Additionally, an aspect of the present invention according to a third disclosed embodiment is a probe characterized by a structure according to the above-summarized first and second embodiments and further characterized by the single-crystalline material made of a single crystal diamond.

A single crystal diamond is known to be the hardest material and is characterized by very high wear resistance as the property of the single-crystalline material. Then, if the scanning direction of a probe can be set parallel to the direction <110> of a {100} plane, which is relatively easy to form, the wear of the probe can be preferably prevented.

An aspect of the present invention according to a fourth disclosed embodiment is a cantilever with a probe according to the above-summarized second and third embodiments, wherein both side faces of the beam part in the cantilever parallel to each other, the probe is disposed on the main surface of the beam part so that both side faces of the flat plate part and those of the beam part are parallel to each other, the distance between both side faces of the flat plate part has a length 0.9 to 1.1 times of that of both side faces between the beam part, and the probe is bonded using a liquid adhesive onto the main surface of the beam part as disposed thereon.

Then, the aforementioned positional configuration of a probe and a beam part allows both side faces of the flat plate part of the probe and that of the beam part to be in alignment with a nearly same plane.

According to an embodiment of a probe for use in an SPM in accordance with the present invention, even if manufactured using a single-crystalline material having distinctive properties, an SPM probe will allow a high precision adjustment of crystal orientation as mounted on the beam part of a cantilever. Accordingly, an advantage will be obtained that allows for providing a cantilever making full use of the properties of the single-crystalline material.

According to an embodiment of a cantilever manufacturing method of the present invention, when both side faces of the flat plate part of a probe and that of the beam part of a cantilever are on an approximately same plane and bonded using a liquid adhesive, a surface tension will act on the surface of the liquid adhesive and push both side faces of the beam part and those of the flat plate part. Consequently, an advantage will be obtained that allows for automatic adjustment of the crystal orientation of a probe to an optimal direction.

EXPLANATIONS ARE PROVIDED BELOW REGARDING PREFERABLE EMBODIMENTS OF THE PRESENT INVENTION

A probe 1 according to a preferable embodiment of the present invention consists of a needle-like part 1a and a flat plate part 1b, which are integrally formed as illustrated in FIG. 1, and is used as the tip of a cantilever 2 of an SPM.

A single-crystalline material 4 having distinctive properties can be used as a material for a probe 1 according to a preferable embodiment of the present invention. More specifically, use of a single crystal diamond, which is a material having a high wear resistance, is preferable, but a single crystal sapphire or silicon nitride can be used instead.

In measurement or observation using an SPM, a probe 1 and a sample surface are either in an extreme proximity, where interactions such as atomic force can occur, or in a full contact. Then, use of a material having high wear resistance as a single-crystalline material 4 is preferable because the wear of the probe 1 can be prevented in measurement or observation by scanning with a cantilever 2 having the probe 1; consequently, the measuring resolution of the SPM can be long maintained.

The needle-like part 1a of a probe 1 is given a length of not less than 10 micrometers, while the point of the needle-like part 1a has a diameter of several nanometers to several tens of nanometers. Elongation of the needle-like part 1a facilitates applicability to a high aspect ratio structure. Here, the needle-like part 1a can be given a length of 1,000 micrometers so that it can be used for deep etched sample. Alternatively, the needle-like part 1a can be given a length of less than 500 micrometers to make the probe 1 less prone to breakage when colliding with a sample material.

Meanwhile, the flat plate part 1b of the probe 1 is given a bottom width of 20 to 500 micrometers, a depth of 20 to 500 micrometers, and a thickness of 5 to 500 micrometers, or preferably 5 to 20 micrometers. Here, the flat plate part 1b can have a bottom thickness of less than 20 micrometers so that a reduced weight of the probe 1 will prevent the lowering of the resonance frequency of a cantilever 2 and consequently increase the resolution of an SPM. Alternatively, the flat plate part 1b can be not less than 20 micrometers thick to make the flat plate part 1b less prone to breakage. On the other hand, the probe 1 should preferably have a bottom area exceeding 400 micrometers so that a sufficient contact area between the bottom face and the beam part 2a of the cantilever 2 can prevent disengagement of the probe 1 from the cantilever 2.

Then, a side face of the flat plate part 1b of the probe 1 should be provided with at least one flat surface 1c in order to indicate the crystal orientation of the single-crystalline material 4. The crystal orientation of this flat surface 1c should preferably be selected to be parallel to a side face of a cantilever 2 when the scanning direction of the cantilever 2 coincides with the most wear-resistant crystal orientation of the single-crystalline material 4. This is because the crystal orientation of the flat surface 1c, if so selected, can be easily adjusted with high precision when mounting the probe 1 on the beam part 2a of the cantilever 2.

Moreover, the at least one flat surface 1c on the side faces of the flat plate part 1b should preferably be formed parallel to each other. In particular, when the probe 1 has a point-symmetric shape, whichever flat surface 1c can be used for crystal orientation adjustment when mounting the probe 1 on the beam part 2a of a cantilever 2. Another desirable advantage is the ease of retaining of the probe 1 when mounting the probe 1 on the beam part 2a of the cantilever 2.

Finally, the needle-like part 1a and the flat plate part 1b should be integrally formed using the same single-crystalline material 4. Detailed explanations are given below regarding methods of forming a probe 1.

A single-crystalline material 4 used as the material of a probe 1 described above is cut out to have a bottom face shaped similarly to that of the flat plate part 1b of the probe 1 and a thickness equivalent to the sum of the length of the needle-like part 1a of the probe 1 and the thickness of the flat plate part 1b. Thus, the entire single-crystalline material 4 is polished by publicly known polishing means such as fixed- or slurry-abrasive particles or by scaife polishing for a particular single crystal diamond.

A side face of the single-crystalline material 4 thus cut out should contain at least one flat surface 1c in order to indicate the crystal orientation of the single-crystalline material 4. The crystal orientation of the flat surface 1c should preferably be selected to be parallel to a side face of the beam part 2a of a cantilever 2 when the scanning direction of the cantilever 2 coincides with the most wear-resistant crystal orientation. This is because the crystal orientation of the flat surface 1c, if so selected, can be easily adjusted with high precision when mounting the probe 1 on the beam part 2a of the cantilever 2.

The polished single-crystalline material 4 should have a face provided with a needle-like part 1a, which is formed by ablating the surface of the face except a region corresponding to the needle-like part 1a. Available ablation techniques include laser ablation, plasma etching, focused ion beam- (FIB) processing, and thermochemical processing among others. Alternatively, means such as a chemical vapor deposition (CVD) method can be employed to form such a needle-like part 1a on a flat plate part 1b consisting of the polished single-crystalline material 4.

For example, when a laser ablation technique is used to form a needle-like part 1a, any of the first through third techniques below, for example, can be used to form a modified region 5 on the surface of a single-crystalline material 4 excluding a region where the needle-like part 1a is formed. Then, the modified region 5 is ablated by means of, for example, etching to form such a needle-like part 1a on the single-crystalline material 4.

The first technique uses a laser 3 that exhibits intrinsic absorption for a single-crystalline material 4 and moves a focus 3c of the collected light relatively to the single-crystalline material 4.

This technique uses, for example, a YAG laser and harmonics thereof, $CO_2$ laser, or an excimer laser as the laser 3. Then, the single-crystalline material 4 is placed, for example, as shown in FIG. 2 (a), on a stage 10 having an XYZ movable stage, where the laser 3 emitted from a laser source 3a is collected by a lens 3b into the focus 3c on the surface of the single-crystalline material 4. Then, the XYZ movable stage (not illustrated) is operated to move the single-crystalline material 4 relatively to the focus 3c and form a modified region 5 in proximity of the focus 3c.

The second technique uses a laser 3 that exhibits intrinsic absorption for a single-crystalline material 4, in which a masking 11 is pre-formed, to irradiate the laser 3 on a predetermined irradiation area and form a modified region 5 thereon.

This technique uses, for example, a YAG laser and harmonics thereof, $CO_2$ laser, or an excimer laser as the laser 3. In a region of the surface of the single-crystalline material 4, where a probe 1 is to be pre-formed, the pattern of a masking 11 is pre-formed and the single-crystalline material 4 is placed, as shown in FIG. 2 (b), on a stage 10, where the beam of the laser 3 is narrowed down as necessary by means of a lens 3b to irradiate a desired area on the single-crystalline material 4 and form a modified region 5 on the region uncovered by the masking 11.

The third technique uses a laser 3 that exhibits multi-photon absorption for a single-crystalline material 4 and moves a focus 3c of the collected light relatively to the single-crystalline material 4.

This technique uses, for example, a Ti-sapphire laser as the laser 3. Then, the single-crystalline material 4 is placed, for example, as shown in FIG. 2 (c), on a stage 10 having an XYZ movable stage so that at least its one side mirror-polished face will be oriented to a laser source 3a. Following that, the laser 3 emitted from the laser source 3a is collected by means of a lens 3b into the focus 3c and the XYZ movable stage (not illustrated) is operated to move the single-crystalline material 4 relatively to the focus 3c and form a modified region 5. Then, the laser 3 exhibits multi-photon absorption and provides activation energy required for phase change to form the modified region 5 inside the single-crystalline material 4. The forming of the modified region 5 should preferably start from the farthest to the nearest face from the laser source 3a in order of distance until the surface of the single-crystalline material 4 is eventually reached.

On the other hand, when a thermochemical ablation technique is used to form a needle-like part 1a, a single crystal diamond (FIG. 3 (a)) is used as a single-crystalline material 4. After planarization of an ablated surface of the single crystal diamond by means such as mirror-polishing technique to less than Ra=1 nm, a thin film 6 of a carbon-soluble metal such as nickel, rhodium, palladium, platinum, iridium, tungsten, molybdenum, manganese, iron, titanium, chromium, or an alloy consisting thereof is formed with a uniform thickness of not less than 0.1 micrometers on the ablated surface of the single crystal diamond (FIG. 3 (b)). The thin metal film 6 can be formed using a film formation technique such as sputtering method, molecular beam epitaxy (MBE) method, vacuum evaporation method, ion plating method. Here, the thin metal film 6 can be given a thickness of at least 0.1 micrometers to make the thin metal film less prone to aggregation in the heat-treatment process described below.

A thin metal film 6 is partially ablated by means such as mechanical processing, laser ablation, photolithography, and focused ion beam (FIB) processing among others according to the shape of a needle-like part 1a in order to form a single crystal diamond exposing portion 7 (FIG. 3 (c)). Then, a single crystal diamond containing the partially ablated thin metal film 6 is heat-treated to cause absorption of carbon atoms of the single crystal diamond into the thin metal film 6. Then, the thin metal film 6 will be embedded into the single crystal diamond while leaving the single crystal diamond exposing portion 7 behind (FIG. 3 (d)). Consequently, the single crystal diamond exposing portion 7 is left untreated. The residual of the thin metal film 6 on the surface of the single crystal diamond can be removed as necessary by means such as acid treatment (FIG. 3 (e)). Thus, the process described above can be used to form the needle-like part 1a on the single crystal diamond with high precision.

A probe 1 thus formed is mounted on the tip of the beam part 2a of a cantilever 2. The beam part 2a used here is such that has at least one side containing a flat surface 2c when the face on which the probe 1 is mounted is specified as the top face.

Here, it is desirable that, as shown in FIG. 4, both side faces be formed as flat surfaces 2c parallel to each other at least in the vicinity of a probe 1-mounting position of a beam part 2a of a cantilever 2. Moreover, it is also preferable that a probe 1 be formed to have flat surfaces 1c, of which both surfaces are parallel to each other.

The probe 1 is mounted on the top face of the beam part 2a of the cantilever 2 in such a manner that a flat surface 1c formed on the probe 1 will be mutually parallel to (and preferably on a same plane as) a flat surface 2c formed on the beam part 2a. This parallel alignment provides a condition where the crystal orientation of the probe 1 on the cantilever 2 allows full use of the properties of the probe 1.

Here, it is preferable that the flat plate part 1b and the cantilever 2 be configured so that the distance ratio between each of their respective side faces will be 0.9 to 1.1. It is additionally preferable that the probe 1 and the beam part 2a be bonded together using a liquid adhesive 8, because, in such a case, the surface tension of the liquid automates the angle adjustment process. As a preferable example of liquid adhesive 8, an epoxy-based adhesive liquefied at ambient temperature or a thermally fusible brazing material can be used.

A rectangular parallelepiped single crystal diamond was prepared which had a {100} plane in its top face, a bottom of 50 micrometers square, and a thickness of 100 micrometers. The crystal orientation of the single crystal diamond was defined by the top face with {100} plane and the directions of both side faces with {110}. After polishing each face of the single crystal diamond, a thin nickel film 1 micrometer thick was formed on its top face. Then, an opening with a diameter of approximately 10 nm was cut in the thin nickel film by means of electron beam lithography. When all set, thermo-chemical processing was carried out to fuse a 50 micrometers thick layer around the single crystal diamond except the opening into the thin nickel film and form a needle-like part thereon. As the result, a probe made of a single crystal diamond was formed with the needle-like part having a length of 50 micrometers long and a point diameter of 10 nm, and a bottom diameter of approximately 10 micrometers around the boundary with the flat plate part.

Then, a cantilever beam part with both side faces parallel to each other with a distance of 50 micrometers in between was prepared. After a small quantity of an epoxy-based adhesive was applied on the bonding face of the beam part to the probe, the probe was placed on and bonded to the bonding face. Then, an angle between the direction <110>, which was the most wear-resistant crystal orientation of the diamond probe, and the direction perpendicular to the side face of the beam part prepared as the scanning direction of the cantilever was limited to within approximately 5° without any angle adjustment performed.

BRIEF DESCRIPTIONS OF THE DRAWINGS

Figure 1:
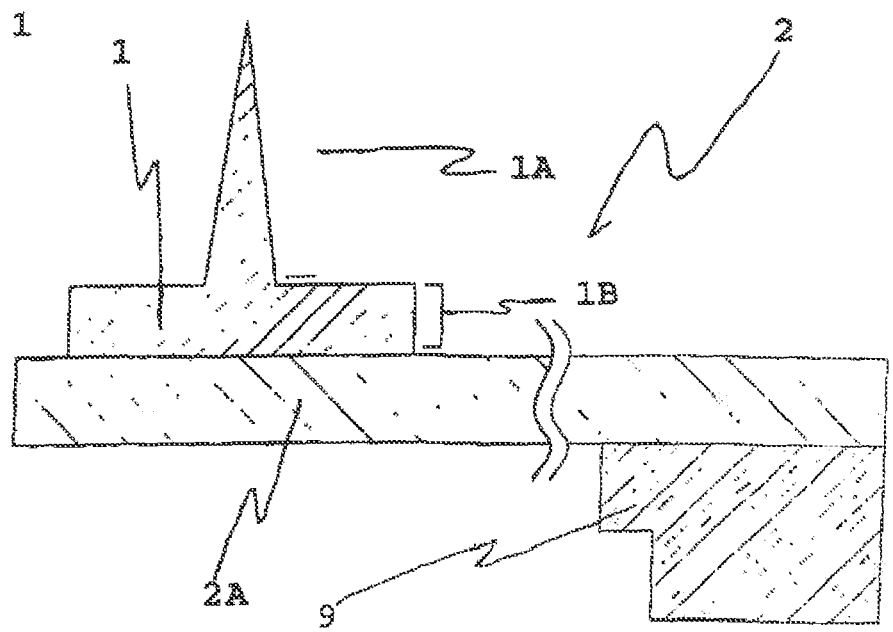
FIG. 1 is a cross-sectional view illustrating a probe and a cantilever according to an embodiment of the present invention.
Figure 2:
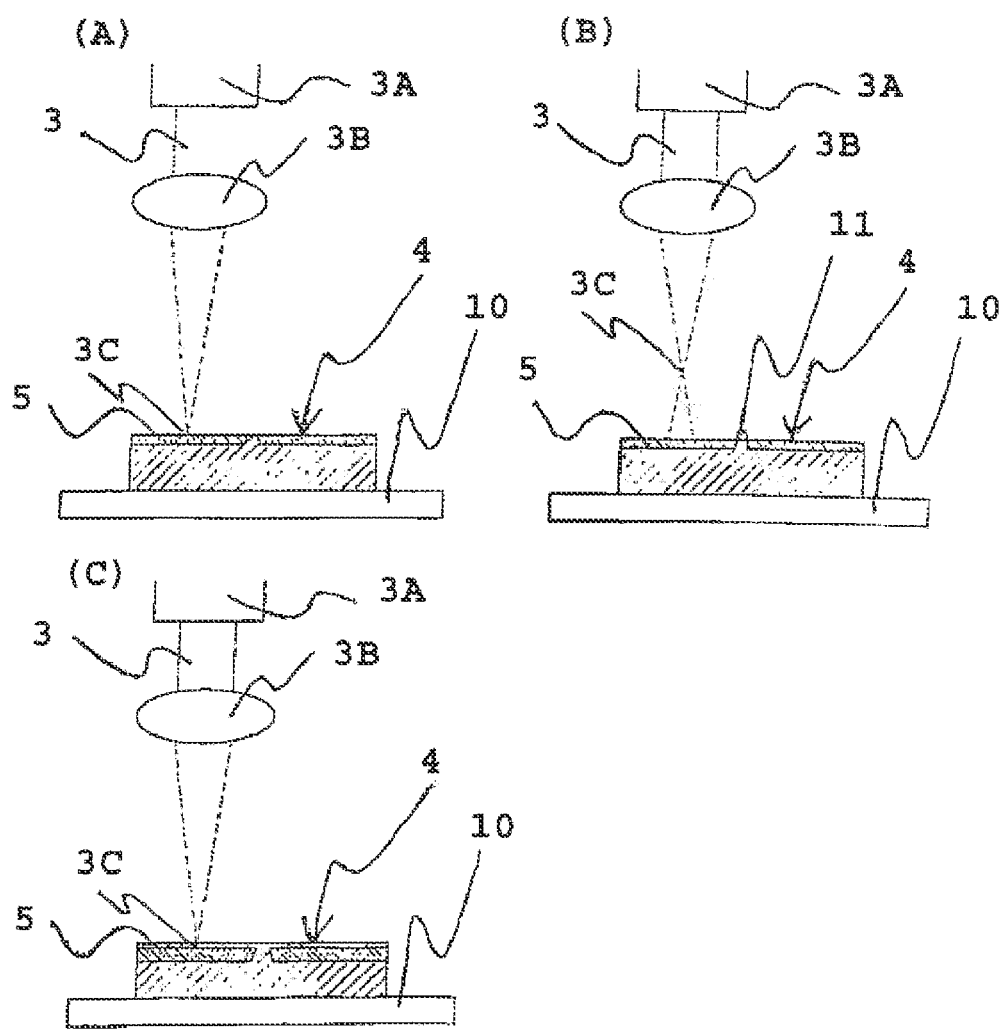
FIG. 2 is a cross-sectional view illustrating a process for forming a needle-like part of a probe using a laser ablation processing according to an embodiment of the present invention.
Figure 3:
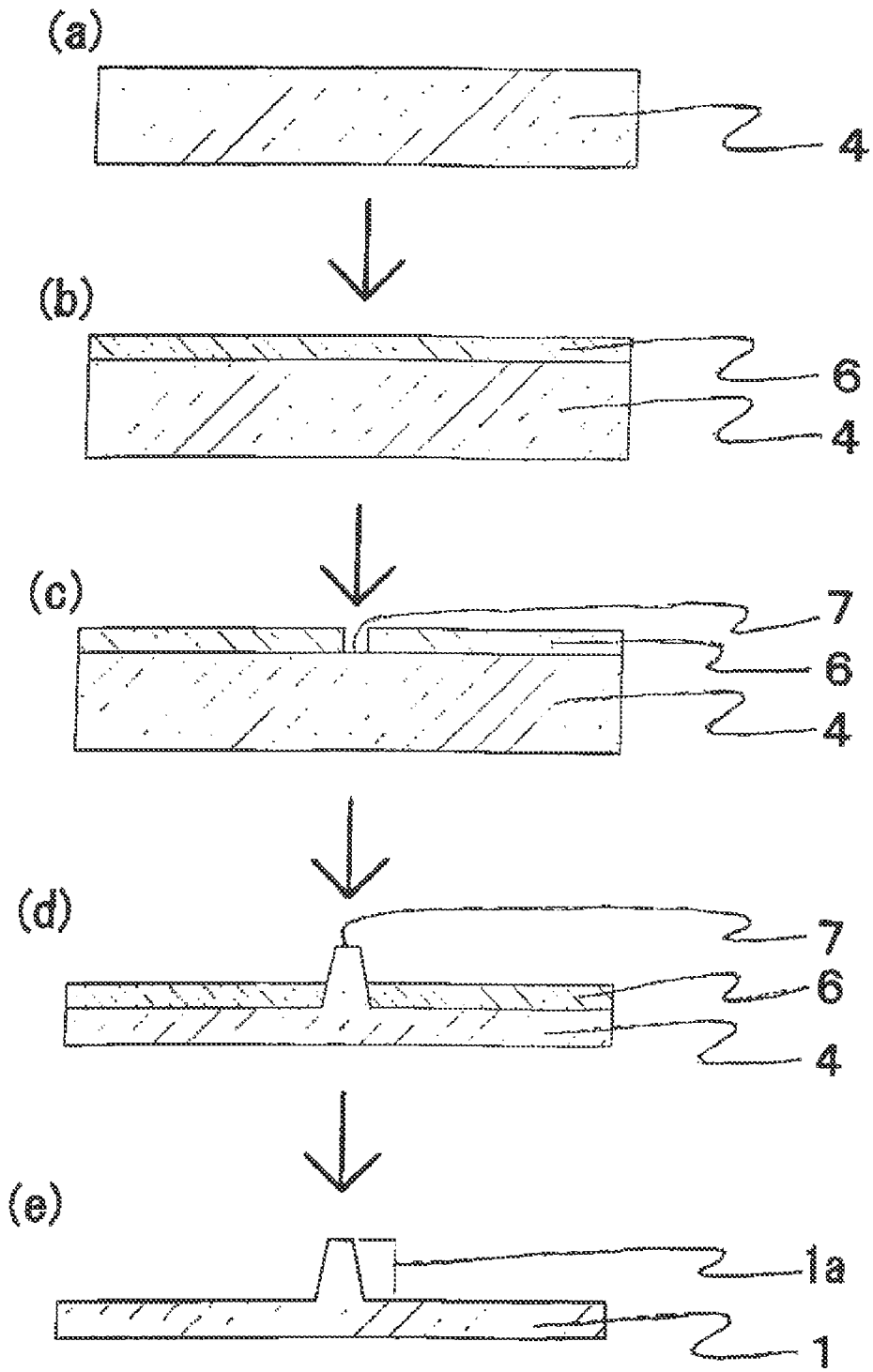
FIG. 3 is a cross-sectional view illustrating a process for forming a needle-like part of a probe using a thermochemical processing technique according to an embodiment of the present invention.
Figure 4:
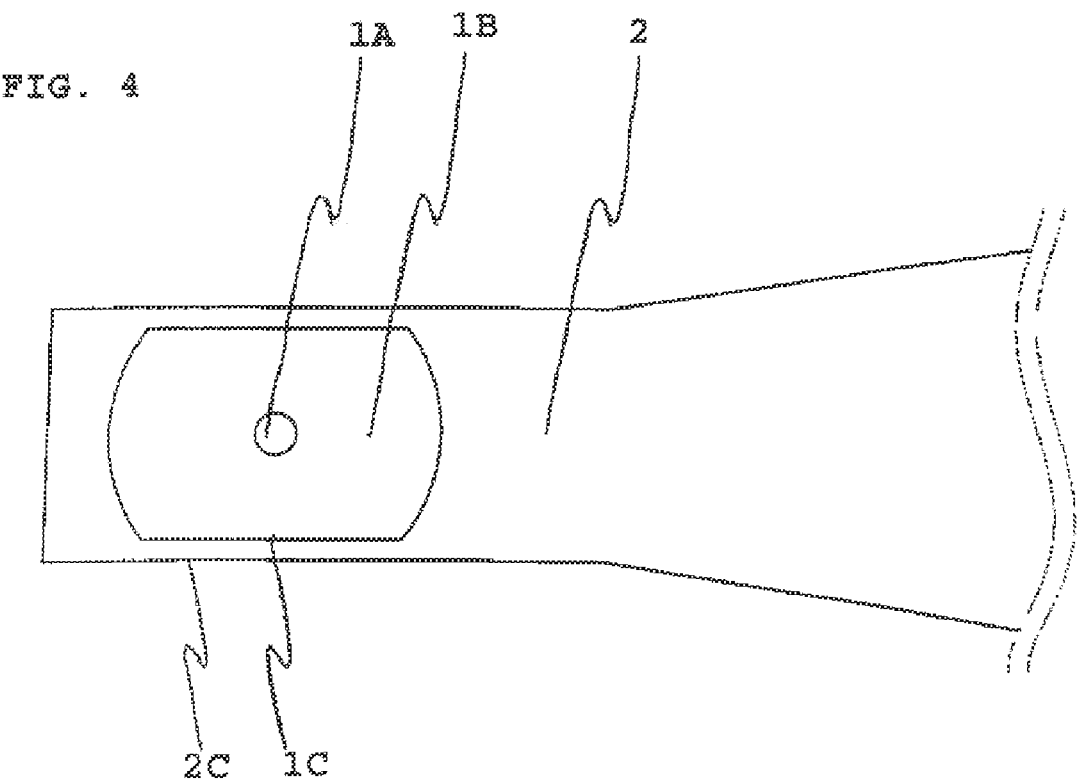
FIG. 4 is a plan view illustrating a preferably formed cantilever beam part according to an embodiment of the present invention.
Figure 5:
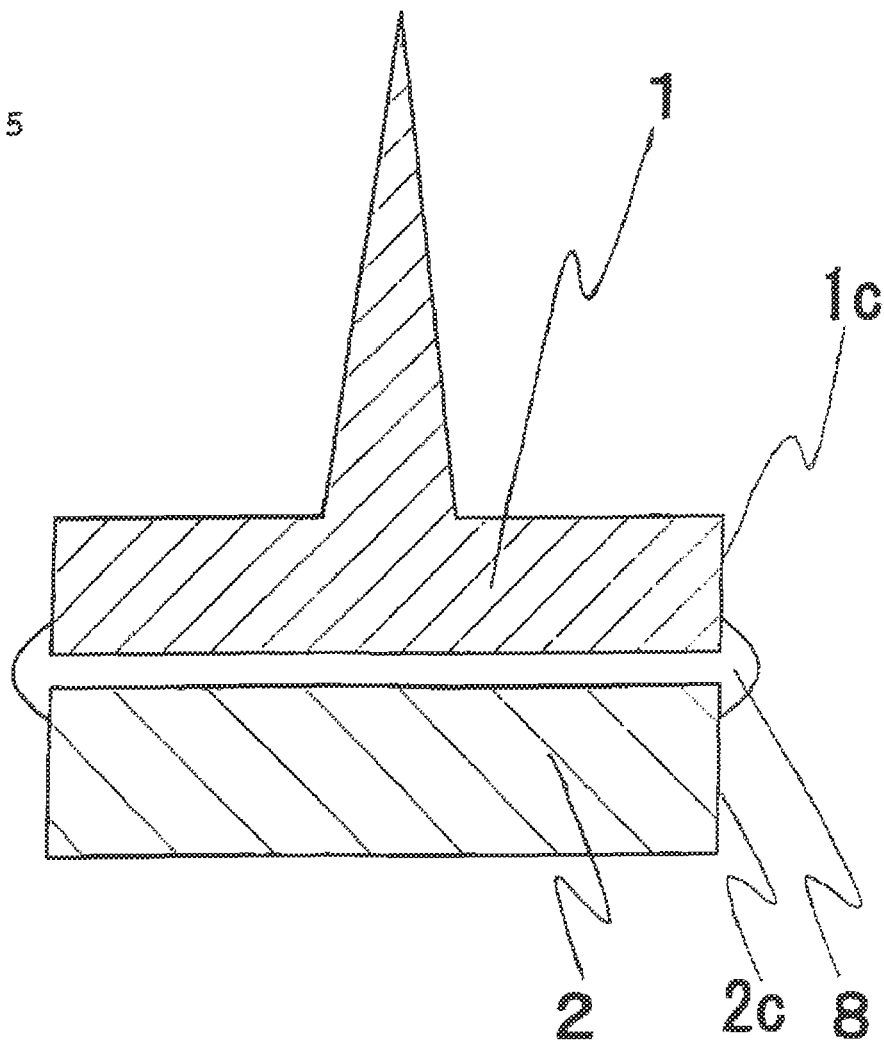
FIG. 5 is a cross-sectional view illustrating a preferable process for bonding a probe and a cantilever beam part according to an embodiment of the present invention.

What is claimed is:

1. A probe disposed at a tip of a cantilever for use in a scanning probe microscope, the probe comprising:
   a needle-shaped part having a length of not less than 10 μm, and
   a flat plate part having a face contacting a beam part of the cantilever, the flat plate part further including at least one side face with a flat surface,
   wherein the needle-shaped part and the flat plate part are integrally formed from a single-crystalline material, and the flat surface on the at least one side face of the flat plate part is an indicator of a crystal orientation of the single-crystalline material.

2. A probe according to claim 1, wherein the flat plate part includes two side faces, each on an opposite side of the flat plate part and having a flat surface, and both side faces of the flat plate part are parallel to each other.

3. A cantilever having a probe according to claim 2,
   wherein the beam part of the cantilever includes two side faces,
   wherein both side faces of the beam part of the cantilever are parallel to each other,
   wherein the probe is disposed on a main surface of the beam part so that both side faces of the flat plate part and the side surfaces of the beam part are parallel to each other,
   a distance between both side faces of the flat plate part has a length 0.9 to 1.1 times that of both side faces of the beam part, and
   the probe is bonded using a liquid adhesive onto the main surface of the beam part.

4. A probe according to claim 2, wherein the single-crystalline material is made of a single crystal diamond.

5. A probe according to claim 1, wherein the single-crystalline material is made of a single crystal diamond.

6. A cantilever having a probe according to claim 5,
   wherein the beam part of the cantilever includes two side faces,
   wherein both side faces of the beam part of the cantilever are parallel to each other,
   wherein the probe is disposed on a main surface of the beam part so that both side faces of the flat plate part and the side surfaces of the beam part are parallel to each other,
   a distance between both side faces of the flat plate part has a length 0.9 to 1.1 times of that of both side faces of the beam part, and
   the probe is bonded using a liquid adhesive onto the main surface of the beam part.

* * * * *